(12) United States Patent
Jang et al.

(10) Patent No.: US 8,231,850 B2
(45) Date of Patent: Jul. 31, 2012

(54) ECONOMICAL SEQUESTRATION OF CARBON DIOXIDE BY THE MIXED GAS

(75) Inventors: Young Nam Jang, Daejeon (KR); Kyung Won Ryu, Daejeon (KR); Myung Gyu Lee, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

(21) Appl. No.: 12/873,654

(22) Filed: Sep. 1, 2010

(65) Prior Publication Data
US 2011/0300045 A1 Dec. 8, 2011

(30) Foreign Application Priority Data
Jun. 8, 2010 (KR) .................. 10-2010-0053852

(51) Int. Cl.
*B01D 53/62* (2006.01)
*C01C 1/24* (2006.01)
*C01F 11/46* (2006.01)
(52) U.S. Cl. ........ 423/234; 423/220; 423/352; 423/356; 423/357; 423/555
(58) Field of Classification Search .................. 423/210, 423/220, 234, 352, 356, 357, 554, 555; 502/340
See application file for complete search history.

(56) References Cited

FOREIGN PATENT DOCUMENTS
KR 10-2010-0008 * 1/2010
KR 1020100008342 A 1/2010

OTHER PUBLICATIONS

The Engineering ToolBox, "Solubility of Gases in Water." (Available online as of Feb. 11, 2007) Viewed Dec. 27, 2011 at http://web.archive.org/web/20070211143052/http://www.engineeringtoolbox.com/gases-solubility-water-d_1148.html.*
Beychok, Milton R., "Fundamentals of Stack Gas Dispersion" (section entitled "Air Dispersion Modeling Conversions and Formulas"). 4th Ed., Published 2005 (ISBN 0964458802) (available online at least as of Apr. 22, 2009). Viewed Dec. 27, 2011 at http://web.archive.org/web/20090624221152/http://www.air-dispersion.com/formulas.html.*

* cited by examiner

*Primary Examiner* — Stuart Hendrickson
*Assistant Examiner* — Daniel Berns
(74) *Attorney, Agent, or Firm* — The Webb Law Firm

(57) ABSTRACT

Provided is a fixation method of carbon dioxide. The method includes a) grinding waste gypsum to become 200~300 mesh; b) performing reaction by supplying mixed gas while mixing the ground waste gypsum with aqueous ammonia, and c) separating solid from liquid in the manufactured slurry by centrifugation and drying separated solid and liquid portions with calcite and ammonium sulfate, wherein the mixed gas is formed of nitrogen and carbon dioxide, and the carbon dioxide provides carbon dioxide fixation method containing 5~25 wt %. When carbon dioxide is fixed by using waste gypsum, reaction efficiency is remarkably high. The fixation method makes more than 95% of supplied carbon dioxide fixed. Also, provided is an economical method that disposes carbon dioxide as a disposal target without its separation, refinement and liquefaction processes, to thereby remarkably reduce the entire process and costs for processes.

5 Claims, 4 Drawing Sheets

[Fig. 1]
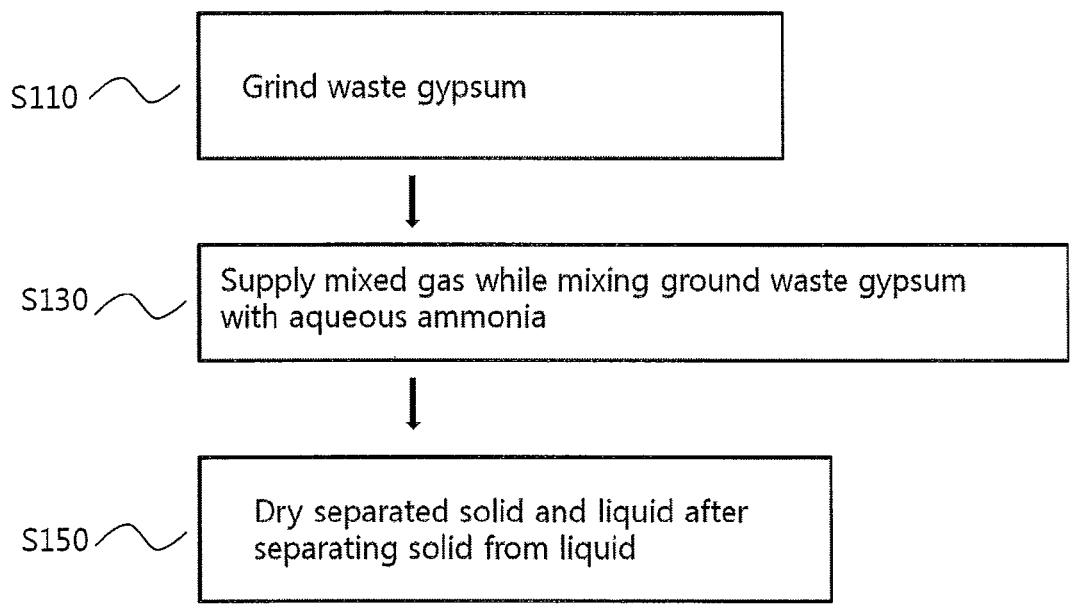
[Fig. 2A]
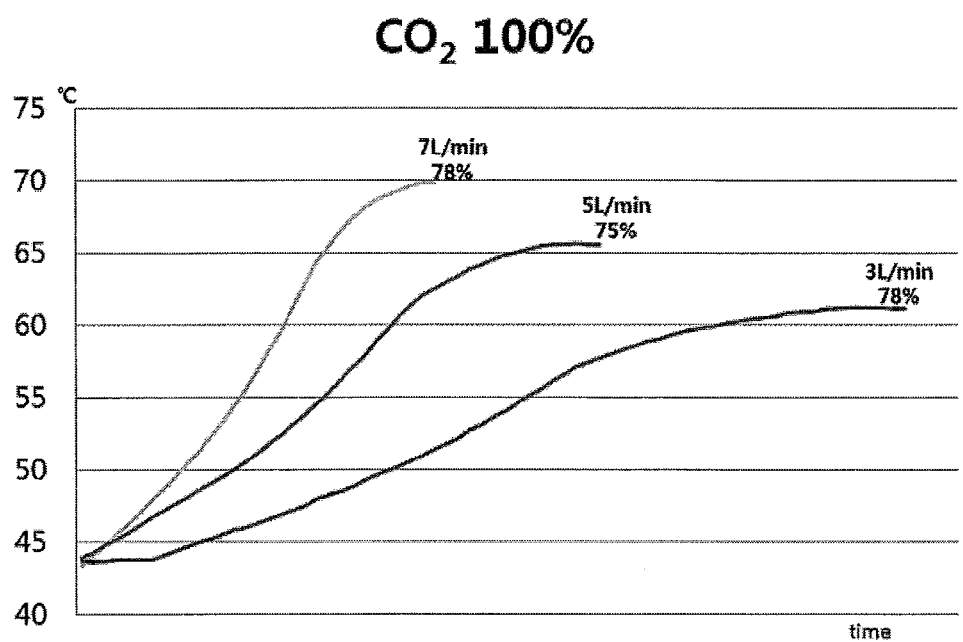

[Fig. 2B]
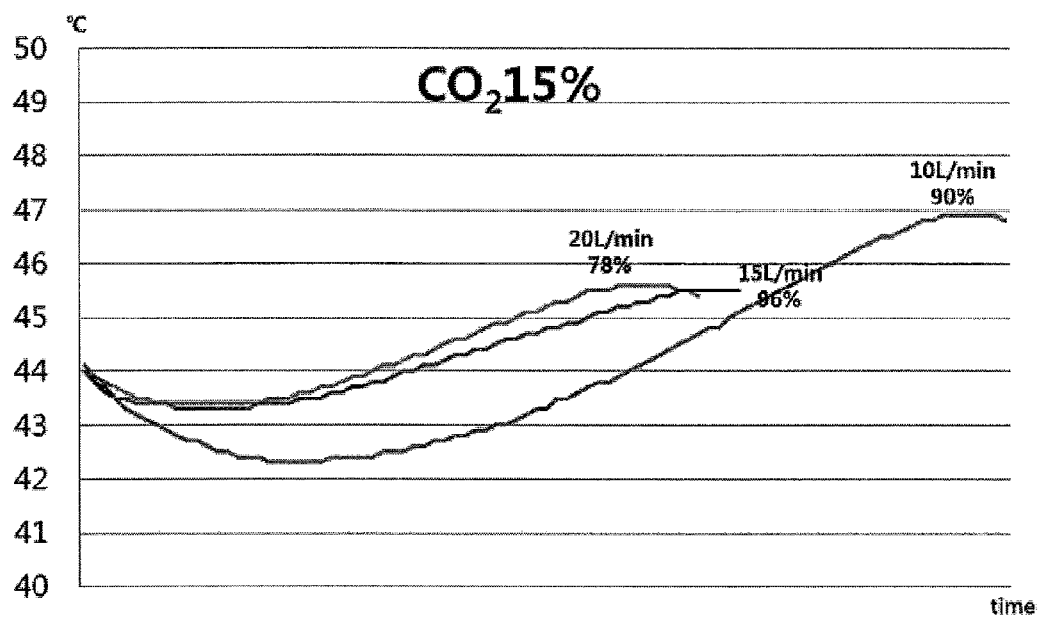
[Fig. 3A]
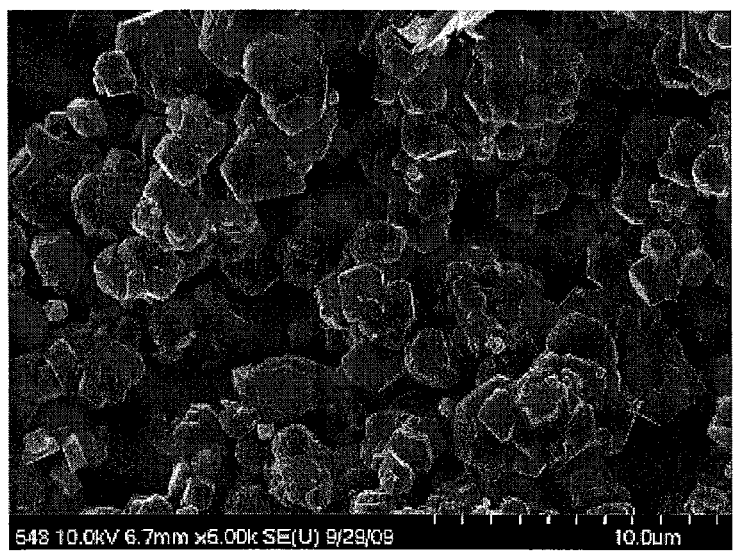

[Fig. 3B]
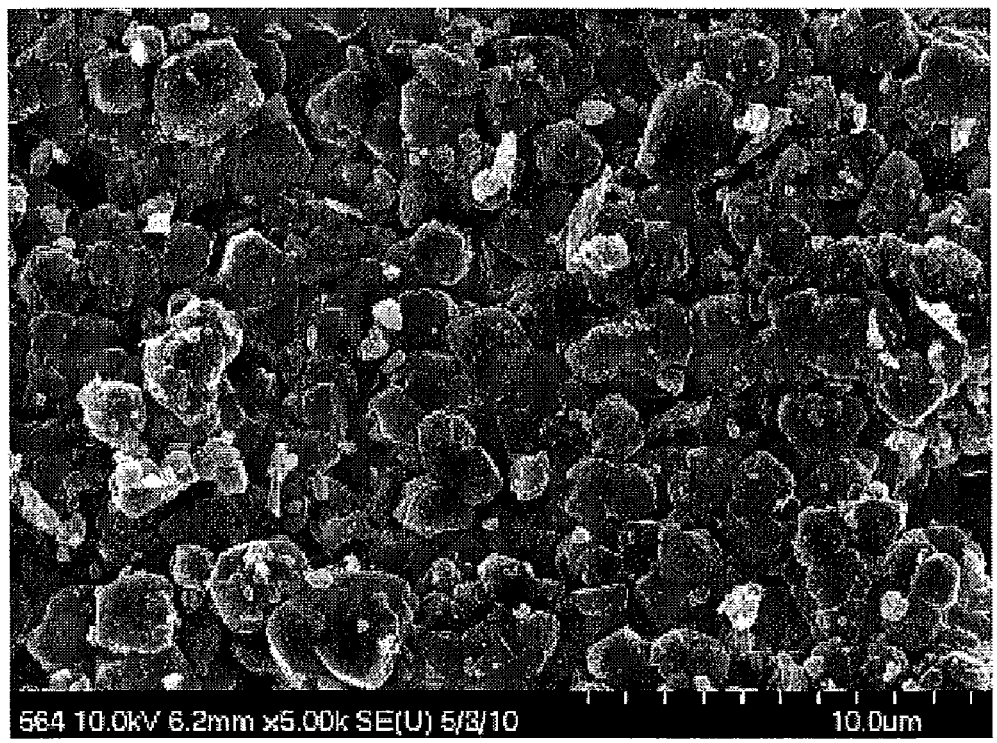

[Fig. 4]
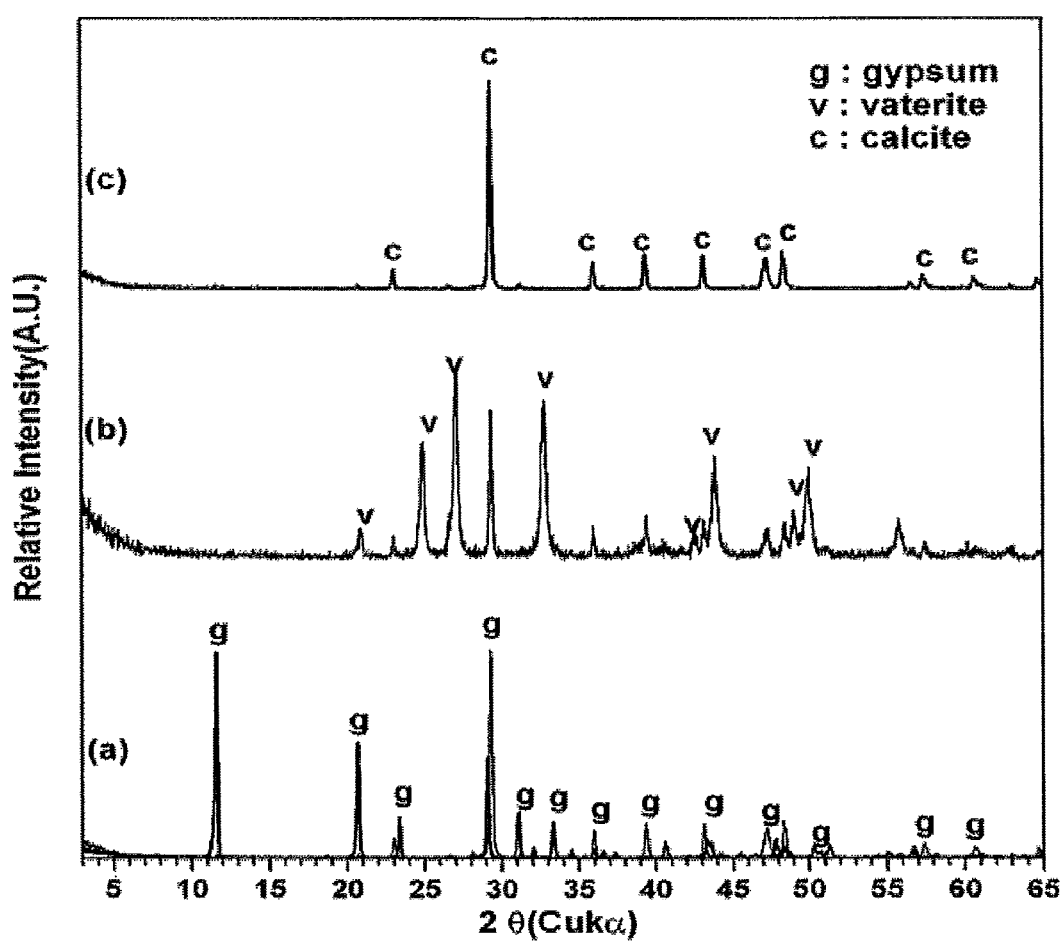

ECONOMICAL SEQUESTRATION OF CARBON DIOXIDE BY THE MIXED GAS

CROSS-REFERENCE TO RELATED APPLICATIONS

This application claims priority under 35 U.S.C. §119 to Korean Patent Application No. 10-2010-0053852, filed on Jun. 8, 2010, in the Korean Intellectual Property Office, the disclosure of which is incorporated herein by reference in its entirety.

TECHNICAL FIELD

The following disclosure relates to a method that efficiently and economically fixes carbon dioxide by using waste gypsum, particularly, Flue Gas Desulfurized (FGD) gypsum.

BACKGROUND

The emission of greenhouse gas being discharged in South Korea is world top 10 based on 2005, and the emission increase speed is currently No. 1 in the world together with China. The global regulation according to emissions of greenhouse gas is about to be tightened up in the future by coming into effect of Kyoto Protocol imposing reduction obligations of greenhouse gas, so the pan-governmental measures responding this are necessary in our country, South Korea. When we bear reduction obligations by about 10%, several tens of millions tons of greenhouse gas emissions should be reduced every year, and this means that domestic companies should bear expenses of several trillion won every year.

The mineral carbonization is a method that can fix $CO_2$ inside the crystal structure of minerals, and makes it a carbonate mineral form by combining natural minerals or industrial by-products including Ca, Mg, Fe elements with $CO_2$, and it is expressed as the following reaction scheme.

$$MO+CO_2=MCO_3+heat$$

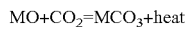

(M=Ca,Mg,Fe)

The mineral carbonization method has many advantages such as needlessness of additional monitoring, etc. because it doesn't have a problem of a disposal site compared to underground disposal, and its disposal is certain and stable. Especially, when compared to the underground disposal, the mineral carbonization method is very advantageous in a problem on a time that $CO_2$ gas can be disposed actually and stably, but it is known as unfavorable in aspects of treatment volume and treatment expenses. For underground disposal of carbon dioxide, the technology first separating, recovering, liquefying and transporting and burying carbon dioxide underground (oil field, etc.) is known.

On the other hand, gypsum as by-products is generated at fertilizer production plants and coal-fired power plants, and at present, it is being generated by 1.5 million tons every year at coal-fired power plants. Gypsum as by-products is partially reutilized in gypsum boards, etc. Theoretically, gypsum of 1.5 million tons/year can dispose separately recovered carbon dioxide of 0.4 million tons/year. The chemical composition of gypsum is $CaSO_4 2H_2O$ as optimal raw materials of mineral carbonization.

The method for fixing carbon dioxide by using waste gypsum is disclosed in KR Patent Application No. 10-2009-0063840. However, the efficiency of the above patent is low because the fixed carbon dioxide is less than supplied carbon dioxide. In addition, since there is an essential process that should previously collect and concentrate $CO_2$ gas being used for fixation reaction, there is a shortcoming that it requires high cost.

SUMMARY

A first embodiment of the present invention is directed to providing a fixation method of carbon dioxide that remarkably enhances fixation efficiency of carbon dioxide by fixing most supplied $CO_2$ gas in order to overcome the shortcoming that the ratio of fixed carbon dioxide declines by 70-75% in the conventional method for fixation of carbon dioxide, compared to supplied carbon dioxide, when 99% pure $CO_2$ gas is used. More particularly, provided is a fixation method of carbon dioxide making more than 95% of supplied carbon dioxide exist stably inside lattices of mineral by reacting carbon dioxide with mineral.

A second embodiment of the present invention is directed to providing a high-economic fixation method of carbon dioxide that remarkably reduces treatment expenses by providing a method that can dispose carbon dioxide as a disposal target without its separation, refinement and liquefaction processes as well as by providing a method that can fix carbon dioxide by reacting carbon dioxide and waste gypsum in mild conditions in order to overcome a conventional problem that has no economic feasibility due to consumption of huge expenses and time for disposing carbon dioxide.

A third embodiment of the present invention is directed to providing a fixation method of carbon dioxide that can also save expenses consumed for moving liquefied carbon dioxide to a disposal field by allowing the fixation process of carbon dioxide to be applied to the field of a thermal power station.

In one general aspect, the fixation method of carbon dioxide includes:

a) grinding waste gypsum to become 100-300 mesh in an operation S110; and b) performing reaction by supplying mixed gas while mixing the ground waste gypsum with aqueous ammonia in an operation S130, wherein the mixed gas is formed of nitrogen and carbon dioxide, and the carbon dioxide provides a fixation method of 5-25 wt % carbon dioxide.

After the step b), the fixation method includes:

c) separating solid from liquid in the manufactured slurry by centrifugation and drying the separated solid and liquid portions with calcite and ammonium sulfate in an operation S150.

FIG. 1 shows a carbon dioxide fixation method according to an exemplary embodiment. The present invention is characterized in that the exhaust gas of a power plant is directly used through a simple process, which does not need a process for separately collecting only carbon dioxide and separating carbon dioxide, by using mixed gas consisting of nitrogen and carbon dioxide. Accordingly, when carbon oxide is fixed according to the present invention, the costs for collecting and separating only carbon dioxide are saved, thereby bringing about positive effects economically.

The present invention has effects that supplied carbon dioxide is fixed by more than 95% because of remarkably high reaction efficiency in the step b), when carbon dioxide is fixed by using waste gypsum.

As a result of performing many trials to overcome a limit that the fixation ratio is low, compared to supplied carbon dioxide, when only pure carbon dioxide is supplied while simply mixing waste gypsum with aqueous ammonia, it is confirmed that when the mixed gas of nitrogen and carbon dioxide is used, the fixation efficiency is remarkably enhanced, compared to what pure carbon dioxide is supplied and reacted in the step b). More particularly, the present inventors discovered that the fixation effect of carbon dioxide is dramatically enhanced by more than 95%, when the ratio of carbon dioxide is 5-25 wt % in mixed gas.

The present invention is an invention to secure economic efficiency by remarkably reducing costs in a process for making carbonate minerals with very superior stability, i.e., calcite by reacting disposed waste gypsum with carbon dioxide which is a main cause of global warming. As mentioned before, when the ratio of carbon dioxide is 5-25 wt %, the fixation efficiency of carbon dioxide is enhanced by more than 95%. Therefore, carbon dioxide and waste gypsum can be converted into mineral and fixed by reaction of the two kinds of waste in the field (in situ) of a thermal power plant where carbon dioxide and waste gypsum are generated at the same time. The more important thing is that it provides a method that fixes and treats carbon dioxide in an economical way by significantly reducing the fixation process since the process that separates, refines, liquefies and transports carbon dioxide is not required. More particularly, the waste gypsum disposed after flue gas desulfurization in a coal-fired power plant may be used. Also, any types of gypsum as well as the waste gypsum may be used.

Hereafter, the present invention will be described in detail. The present invention provides a carbon dioxide fixation method that the supplied flow rate of mixed gas is 10~30 L/min. in the step b).

More specifically, it is preferred that the supplied flow rate of mixed gas is a velocity of 15 L/min, when mixed gas containing 15 wt % carbon dioxide is used. Also, it is preferred that when mixed gas containing 25 wt % carbon dioxide is used, the mixed gas is supplied in a flow rate of 10 L/min. When the mixed gas containing 15 wt % carbon dioxide is used in the step b) and supplied in a flow rate of 15 L/min., the efficiency of the fixed carbon dioxide may be more than 95%. The supplied flow rate of the mixed gas is an important element largely determining reaction efficiency of the step b) in the range. In case of the mixed gas containing 15 wt % carbon dioxide, it is clearly shown in FIG. 2B that the efficiency may be largely enhanced by more than 95%.

As a result, when it is the mixed gas containing 15 wt % carbon dioxide of, the ratio of total supply volume of $CO_2$ to the amount of gypsum supplied to slurry is 0.246, which is close to 0.256 as the maximum theoretical value, i.e., a mole ratio. It proves that the efficiency of the mixed gas containing 15 wt % carbon dioxide is very high.

FIG. 2A is a graph showing reaction efficiency according to the supply amount of gas by using 100% $CO_2$ gas, and FIG. 2B is a graph showing reaction efficiency according to the supply amount of gas by using 15% $CO_2$ gas. Y-axis is a temperature axis and X-axis shows reaction time. Also, the supply amount of gas is indicated as liter/minute (L/min) as supply amount per minute, and the efficiency in the respective condition is indicated as percentage (%).

The carbon dioxide fixation mentioned in the present invention is defined as carbonate mineralization or mineral carbonization that is one of sequestration methods of carbon dioxide that makes carbon dioxide exist stably inside lattices of mineral by reacting carbon dioxide with mineral containing calcium or magnesium.

In the present invention, when waste gypsum is ground to become 200-300 mesh in the step a), its reactivity is good. The waste gypsum ground in the range of 200-300 mesh is reacted by supplying mixed gas, while agitating slurry obtained mixing and agitating the waste gypsum with aqueous ammonia in the step b). The reaction may be effectively generated by agitating at 10~100° C., more preferably, 30~70° C. C. At this time, it is preferred that aqueous ammonia contains 2-40 wt % ammonia in the step b). The efficiency of carbonization reaction may be enhanced by mixing the waste gypsum to be contained by 60-100 parts by weight based on 100 parts by weight of the aqueous ammonia.

In the step b), the total supply amount of the carbon dioxide in mixed gas is dispersedly supplied according to reaction time with 24-30 parts by weight based on 100 parts by weight of inputted waste gypsum.

The present invention relates to the carbon dioxide fixation method including an operation S150 of drying the separated solid and liquid after the solid and liquid are separated from each other in the step b). The solid might be more specifically calcite, and the liquid may be ammonium sulfate solution. As the ammonium sulfate is in an aqueous solution state, calcite and ammonium sulfate in the aqueous solution state may be separated by using a centrifuge or press filter, etc., but its separation method is not limited thereto. Powder is obtained through drying of the separated solid and liquid. Powder is obtained by drying the calcite at 50~80° C., although it is largely not limited. It is preferred to get powder of ammonium sulfate by freeze-drying of ammonium sulfate in the aqueous solution state or evaporation-drying at 80~100° C. The calcite powder and powder of the ammonium sulfate may be confirmed through instrumental analysis such as X-ray diffraction analysis.

The present invention has effects that supplied carbon dioxide is fixed by more than 95% because of high reaction efficiency in the above step b), when carbon dioxide is fixed by using waste gypsum.

As the present invention uses mixed gas containing 5-25 wt % carbon dioxide, the fixation efficiency of carbon dioxide is enhanced by more than 95%. Therefore, carbon dioxide and waste gypsum may be converted into mineral and fixed by reaction of the two kinds of waste in the field (in situ) of a thermal power plant where carbon dioxide and waste gypsum are generated at the same time. More important thing is that it provides a method that fixes and treats carbon dioxide in an economical way by significantly reducing the fixation process through removing of the process that separates, refines, liquefies and transports carbon dioxide.

Also, when the carbon dioxide fixation process developed by the present invention is applied to the thermal power plant, exhaust gas is directly used for carbonization reaction. Accordingly, the expenses and transport costs for capturing carbon dioxide are mostly saved.

Other features and aspects will be apparent from the following detailed description, the drawings, and the claims.

BRIEF DESCRIPTION OF THE DRAWINGS

FIG. 1 shows a carbon dioxide fixation method according to an exemplary embodiment.

FIG. 2A is a graph showing reaction efficiency according to the supply amount of gas by using 100% $CO_2$ gas according to an exemplary embodiment.

FIG. 2B is a graph showing reaction efficiency according to the supply amount of gas by using 15% $CO_2$ gas according to an exemplary embodiment.

FIG. 3A is a picture showing that the calcite prepared in Example 1 was detected by an electron microscope.

FIG. 3B is a photo showing that the calcite prepared in Comparative Example 1 was observed by the electron microscope.

FIG. 4(a) shows an X-ray diffraction pattern of waste gypsum.

FIG. 4(b) shows an X-ray diffraction pattern of vaterite.

FIG. 4(c) shows an X-ray diffraction pattern of the calcite prepared in Example 1.

DETAILED DESCRIPTION OF EMBODIMENTS

Hereinafter, Examples will be described in detail with reference to the accompanying drawings. It is apparent to those having an ordinary skill that following Examples are provided as exemplary embodiments and the present invention is not limited thereto.

EXAMPLE 1

Aqueous ammonia (ammonia content; 25 wt %, 750 g) and waste gypsum (520 g) were mixed with water (2000 g) and slurry was stirred at 40° C. Slurry containing calcite and ammonium sulfate was prepared through reaction for about 34 minutes while blowing carbon dioxide to be added at a speed of 15 liters per minute. The used gas was mixed gas formed of 15% $CO_2$ and 85% nitrogen of 85%.

Upon completion of the reaction, solid calcite and aqueous ammonium sulfate were separated after centrifugation for 10 minutes at a speed of 1000 rpm by the laboratory centrifuge (Union32R, Hanil).

The separated calcite and ammonium sulfate were respectively dried to obtain powders of 316 g and 330 g. Fixation efficiency of carbon dioxide was about 95%.

FIG. 3A is a picture showing that the prepared calcite was detected by an electron microscope.

According to the result that the calcite and the ammonium sulfate were analyzed through X-ray diffraction, the calcite showed d=3.03 A (104), 2.285 A (113), 2.09 A (202) and the ammonium sulfate showed d=4.33 (111), 3.94 A (200), 3.032 A (031), and 2.97 A (002). Accordingly, it was confirmed that the calcite and the ammonium sulfate were prepared.

COMPARATIVE EXAMPLE 1

According to the same method as that of Example 1, aqueous ammonia (ammonia content; 25 wt %, 750 g) and waste gypsum (520 g) were mixed with water (2000 g) and slurry was stirred at 40° C. Slurry containing calcite and ammonium sulfate was prepared through reaction for about 15 minutes while blowing $CO_2$ to be added at a speed of 7 liters per minute. The used gas was 100% pure $CO_2$ gas.

Upon completion of the reaction, solid calcite and aqueous ammonium sulfate were separated after centrifugation for 10 minutes at a speed of 1000 rpm by the laboratory centrifuge (Union32R, Hanil).

The separated calcite were dried at 80° C. to obtain powder (369 g). Drying the aqueous ammonium sulfate obtained powder (394 g). Fixation efficiency of carbon dioxide was about 78%. FIG. 3B is a photo showing that the prepared calcite was observed by the electron microscope.

According to an X-ray diffraction result of the calcite and the ammonium sulfate, the calcite showed d=3.03 A (104), 2.285 A (113), and 2.09 A (202) and the ammonium sulfate showed d=4.33 (111), 3.94 A (200), 3.032 A (031) and 2.97 A (002). It is confirmed based on the result that the calcite and the ammonium sulfate were prepared and no vaterite was produced.

FIG. 4(a) shows an X-ray diffraction pattern of waste gypsum and FIG. 4(b) shows an X-ray diffraction pattern of the vaterite. FIG. 4(c) shows an X-ray diffraction pattern of the calcite prepared in Example 1.

Table 1 shows a combination ratio in Example 1 and Comparative Example 1 and fixation efficiency of carbon dioxide.

TABLE 1

| | Combination ratio in Example | | | | | |
|---|---|---|---|---|---|---|
| | Aqueous ammonia (g) | Waste gypsum (g) | Ratio of $CO_2$ in mixed gas (wt %) | Flow rate L/min | Calcite weight (g) | Ammonium sulfate weight (g) | Fixation efficiency of carbon dioxide (%) |
| Example 1 | 750 | 520 | 15 | 15 | 316 | 330 | 96 |
| Comparative Example 1 | 750 | 520 | 100 | 7 | 369 | 394 | 77 |

What is claimed is:

1. A fixation method of carbon dioxide, comprising:
   a) grinding waste gypsum to become 200-300 mesh; and
   b) performing reaction by supplying exhaust gas of a power plant while mixing the ground waste gypsum with aqueous ammonia,
   wherein the exhaust gas contains nitrogen and 5-25 wt % carbon dioxide.

2. The fixation method of claim 1, wherein in the step b), the exhaust gas is dispersedly supplied and a total supply amount of the supplied exhaust gas is 24-30 parts by weight based on 100 parts by weight of the input waste gypsum.

3. The fixation method of claim 1, wherein in the step b), aqueous ammonia contains 2-40 wt % ammonia.

4. The fixation method of claim 3, wherein in the step b), 60-100 parts by weight of the waste gypsum is contained based on 100 parts by weight of aqueous ammonia.

5. The fixation method of claim 1, further comprising:
   c) drying the separated solid and liquid after separating solid from liquid in the step b).

* * * * *